United States Patent
Kussman et al.

(10) Patent No.: US 6,322,282 B1
(45) Date of Patent: Nov. 27, 2001

(54) SHAFT TO ACTUATOR HUB ADAPTER

(75) Inventors: Daniel C. Kussman, Minneapolis; Robert C. Knutson, Minnetonka; Matthew G. Margenau, Golden Valley; Alan D. Stordahl, Eagan; Hexiang Zhu, Plymouth, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/428,347

(22) Filed: Oct. 27, 1999

Related U.S. Application Data

(63) Continuation-in-part of application No. 09/052,662, filed on Mar. 31, 1998, now abandoned.

(51) Int. Cl.[7] .................................................. F16B 2/20
(52) U.S. Cl. ........................... 403/329; 403/289; 403/383
(58) Field of Search .................................... 403/289, 383, 403/329, 252, 315, 376

(56) References Cited

U.S. PATENT DOCUMENTS

| | | |
|---|---|---|
| 255,858 | 4/1882 | Hidden . |
| 434,295 | 8/1890 | Richardi . |
| 892,021 | 6/1908 | Wirsching . |
| 2,257,979 | 10/1941 | Rubinstein . |
| 3,327,994 | 6/1967 | Carl . |
| 3,335,580 * | 8/1967 | Simpson, Jr. .................. 403/359.2 |
| 3,532,372 * | 10/1970 | Stroud ............................. 403/329 |
| 4,576,505 * | 3/1986 | Wrightson et al. ............ 403/383 X |
| 4,637,412 * | 1/1987 | Martinez ......................... 403/383 X |
| 4,778,303 | 10/1988 | Mullins . |
| 4,965,915 | 10/1990 | Steininger . |
| 5,011,322 * | 4/1991 | Schauwecker .................. 403/289 X |
| 5,020,932 * | 6/1991 | Boyd ............................... 403/289 X |
| 5,143,500 | 9/1992 | Schuring et al. . |
| 5,186,567 | 2/1993 | Evenson et al. . |
| 5,481,949 | 1/1996 | Yen . |
| 5,688,070 | 11/1997 | Morelli et al. . |
| 5,716,161 | 2/1998 | Moore et al. . |
| 5,845,175 * | 12/1998 | Kumar et al. .................. 403/329 X |
| 6,116,807 * | 9/2000 | Dzurko et al. .................. 403/329 X |
| 6,125,712 * | 10/2000 | Kaburagi et al. ............... 403/329 X |
| 6,126,356 * | 10/2000 | Russell .......................... 403/252 X |

* cited by examiner

Primary Examiner—Lynne H. Browne
Assistant Examiner—David E. Bochna

(57) ABSTRACT

An adapter is designed to connect a member such as a shaft to the hub forming the output element of an actuator. The adapter includes a connection feature which attaches to the member, and a shaft which mates with the bore in the actuator hub. The adapter has a resilient arm attached to the end of the shaft and which extends through the bore. The shaft also carries a stop element. The arm carries a retainer feature at its end. With the shaft mated with the bore, when the arm is undeflected the retainer feature engages an adjacent end surface of the hub to lock the adapter into place. The arm can be deflected to disengage the retainer feature from the hub and allow the adapter to be removed. In one embodiment, the end surface of the hub and the retainer surface are beveled or slanted to strongly oppose axial loads and yet to allow the adapter to withdraw from the hub's bore upon deflecting the arm.

15 Claims, 3 Drawing Sheets

SHAFT TO ACTUATOR HUB ADAPTER

REFERENCE TO PRIOR APPLICATION

This application is a continuation in part of U.S. patent application Ser. No. 09/052,662 filed on Mar. 31, 1998, now abandoned.

BACKGROUND OF THE INVENTION

There are certain types of torque and force generating actuators which are intended to operate a variety of devices such as valves and dampers. Actuators are classified as either rotary or linear depending on the kind of output provided. However, with the proper type of linkage, rotary actuators may be adapted to provide linear force to a load, and linear actuators may be adapted to provide torque to a load. Rotary actuators are further subdivided into those providing torque through a fraction of a complete rotation and those which can rotate continuously in one direction. In either case these rotary actuators typically rotate quite slowly, with fractional turn actuators typically rotating at a speed of less than one RPM and continuous actuators rotating at a few RPM.

Internally, an actuator typically comprises a small electric motor driving a high ratio reduction gear train so as to reduce the output speed to a level appropriate for the operated device. The motor may drive through a magnetic torque-limiting clutch which allows the actuator to stall for long periods of time with no harm to any of its components. An arm linkage, cam, or rack and pinion can be used to convert the rotational output of the gear train to linear output when required. Actuators usually have the capability of changing drive direction so that the device which is being operated can be driven back and forth between two different positions, with the common option of stopping at any desired point between the two positions. There is usually internal friction in the gear train adequate to prevent the driven device from shifting from its current position when the actuator is inactive. Where this is not true, an internal brake may be provided to hold the driven device in the current position when the actuator is inactive.

Every actuator has some kind of output element to which the device which it drives is connected and which provides the output force or torque generated by the actuator. For rotary actuators there are two main types of actuator output elements. A hub type output element usually has a square or splined bore extending completely through the hub and into which an operated device input shaft fits. A second type of output element comprises a projecting shaft which may be square or splined or have a flat surface for a set screw fastener to which the operated device can connect. Hub type output elements have the advantage of allowing the operated device's mating shaft to be inserted from either end of the hub. Either type of output element usually relies on set screws or U bolts to securely and detachably connect the output element to the device. Square connection cross sections are often preferred over other types because they are relatively cheap to form and have high torque transmitting characteristics. Square shafts and hub bores do have the characteristic of allowing only 90° increments in the orientation of the hub relative to the operated device shaft. In certain situations, say those involving fractional turn actuators, this is disadvantageous.

There is a particular application for a continuously rotating actuator which involves rotating a jackscrew to linearly position a damper or door for example. Such a jackscrew comprises a rod carrying usually Acme or square threads. A traveler with mating threads in a bore is carried on the jackscrew. Rotation of the jackscrew translates the traveler to move the operated device. Operation of the jackscrew for such an application creates a substantial axial load on the jackscrew, which most conveniently is carried by the actuator's output element itself. Jackscrews with their essentially circular cross section cannot be directly connected to the standard actuator output elements. In particular, it is not easy to connect such a jackscrew to an actuator hub having a square bore connection. This is desirable for the simple reason that these hubs are already widely used, so little additional tooling is required to adapt them for this application. Thus, a specialized connection to a square bore output element is required which can handle both torque and axial loads from the jackscrew, and which provides both radial and axial support for the end of the jackscrew attached to the output element. Preferably, this connection should easily attach the jackscrew to the output element, maintain the connection reliably, and allow easy disconnection for adjustment or repair. It is also desirable that the connection provide a small amount of flexibility between the hub and the jackscrew so that axial misalignment between the jackscrew and the hub does not create undue wear on the hub bearings or the hub drive gear.

One solution which suggests itself is to place a stub shaft in the square hole, and connect the jackscrew to the stub shaft. One tried and true arrangement for connecting two shafts involves creating a slot in one and in the other a tab or finger which fits into the slot. A hole is formed in the material defining the slot in the one shaft, and in the other's tab. A pin of some type can then be inserted through the holes to connect the two shafts. Although simple to design, this arrangement has a number of disadvantages. It is difficult to drill the hole in a shaft such as a jackscrew made of hardened steel. The diameter of the pin must of necessity be much smaller than that of either shaft, and yet must carry all of the axial load applied to the shafts. This creates a potential for premature failure of the pin either through overloading or wear which reduces the pin size to a point where failure can occur. Lastly, manufacturability is an issue. Particularly in a crowded space, trying to align both shafts so that the pin can be inserted through their holes can prove difficult and time-consuming. Then, some type of retaining feature must be applied to the pin. For example, if the pin is a machine screw, a nut must be turned onto the end of the screw, and must have some type of locking feature which prevents the nut from working loose during use. If a cotter pin is used, there are issues of strength because of its lengthwise split, and its end must be bent after insertion. But good engineering practice discourages using a cotter pin as a force or torque-carrying member.

There are other types of special actuator-operated devices which are most convenient to connect to existing hub designs. Many of these are more easily connected to shafts than directly to the connection hole in the hub. It is possible to redesign these hubs to provide some type of shaft connection structure. Experience has shown that this approach is less flexible and fails to cooperate well with existing hub structures. Accordingly, we have developed a new type of system for attaching various types of operated elements to the actuator providing the torque or linear force.

U.S. Pat. No. 892,021 (Wirsching) shows a pair of resilient arms each having an outwardly projecting bump at its free end. The arms can be pressed toward each other so as to allow both bumps to enter a rectangular hole in the center of a flat hub such as that of a pointer. Releasing the arms allows the spring force of the arms to retain the hub on the arms.

BRIEF DESCRIPTION OF THE INVENTION

We have developed a specialized adapter for connecting an operated device to an actuator, and to apply both torque and axial force to the operated device. The adapter allows the actuator to provide radial and axial support to various kinds of shaft elements, a jackscrew being only one example. The adapter will typically be designed with specific features allowing it to mate with one particular preselected hub structure and to easily detach from the hub. Our adapter can also be rapidly attached to the hub and rapidly detached from the hub without tools and without access to the hub end adjacent the adapter body. Time required to attach or detach the adapter is very nearly an absolute minimum.

In one embodiment, such an adapter connects an operated device having a predetermined connection structure, to a bore in the actuator hub. The bore has an interior surface, a predetermined length extending between first and second end surfaces of the hub, and a cross section of predetermined size and noncircular shape. The shape of the bore's cross section forms a first predetermined mating feature. The bore is adapted to receive and apply torque to an output shaft having a cross section forming a second predetermined mating feature complementary to the first mating feature and matable therewith. To more clearly describe the adapter it is convenient to define for it an axis of rotation for which is defined first and second opposite directions.

The adapter has a number of cooperating features to accomplish the connection between the operated device and the actuator. These include a body to which other of the features are attached. A connection feature is unitary with the body and extends generally in the first axis direction. The connection feature has structure suitable for connecting to the connection structure of the operated device.

A shaft is attached at a proximal end to the body and extends generally along the second axis direction and terminates in a distal end. Typically, the shaft is unitary with the body. The shaft may be shorter even than its major transverse dimension perpendicular to the axis. The shaft's periphery is shaped to form the second mating feature. There is a stop feature adjacent to and preferably integral with the shaft's proximal end, and having a stop surface generally facing in the second axis direction.

A first arm has a first end attached to the body's distal end. This arm extends generally in the second direction along the axis and terminates in a second end. The arm is formed of a material such as Nylon or Delrin (Dupont Corp. trademarks) or another strong, flexible plastic which allows the arm to resiliently deflect as a beam. The arm has a retainer feature attached to its second end, which retainer feature projects generally perpendicularly to the adapter axis. The retainer feature has a surface generally facing the stop feature. The retainer feature surface is intended to engage a hub end surface when the adapter shaft is in a mated position with the hub's bore, and disengage from the hub end surface by deflection of the flexible arm away from the interior surface of the hub's bore. In a commercial embodiment, there are two bilaterally symmetric arms which are deflected toward each other when removing the adapter from the hub's bore.

DESCRIPTION OF THE PREFERRED EMBODIMENTS

Figure 1:
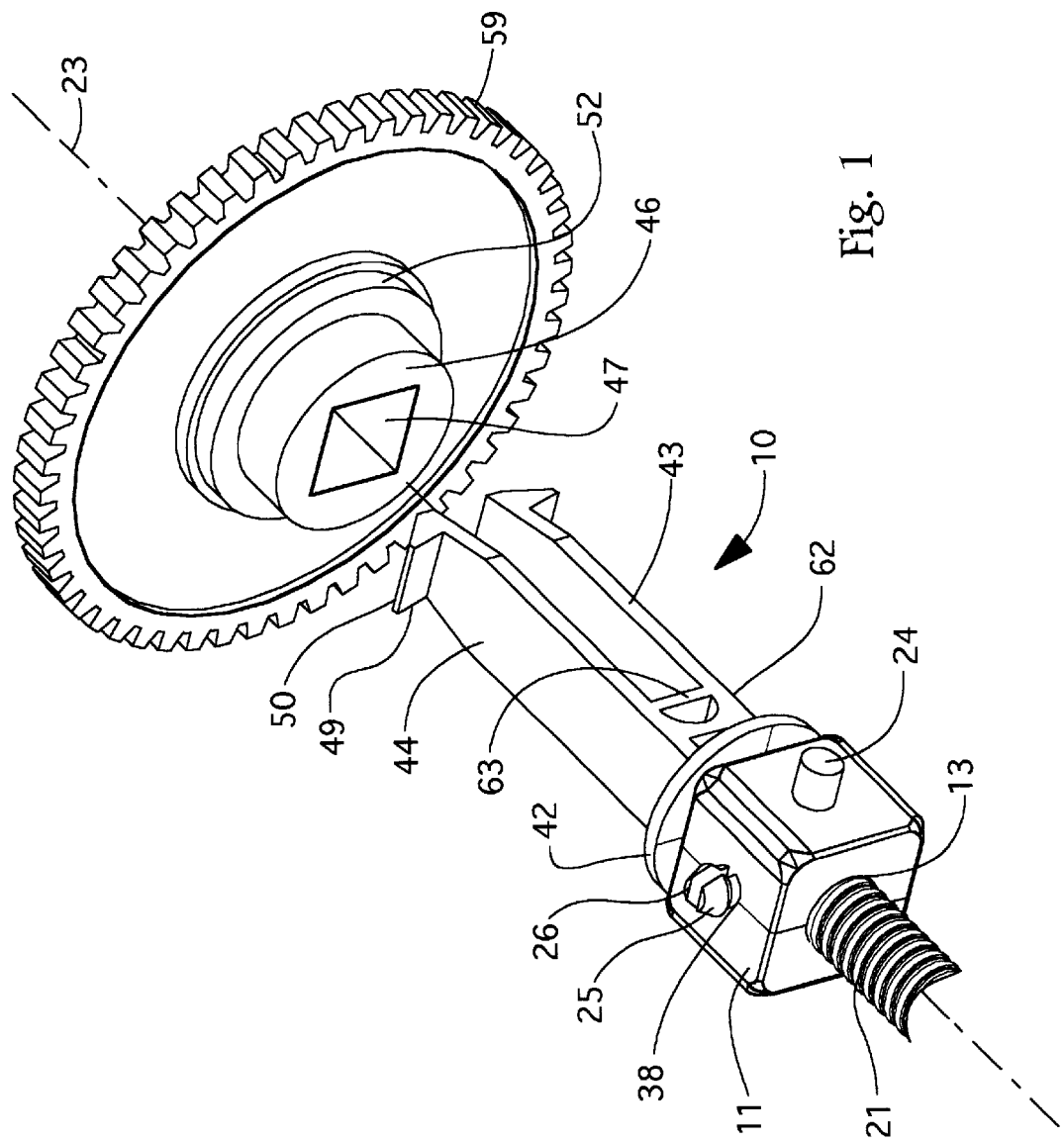
FIG. 1 is an exploded perspective view of a preferred version of the adapter and the hub with which it is intended to mate.
Figure 2:
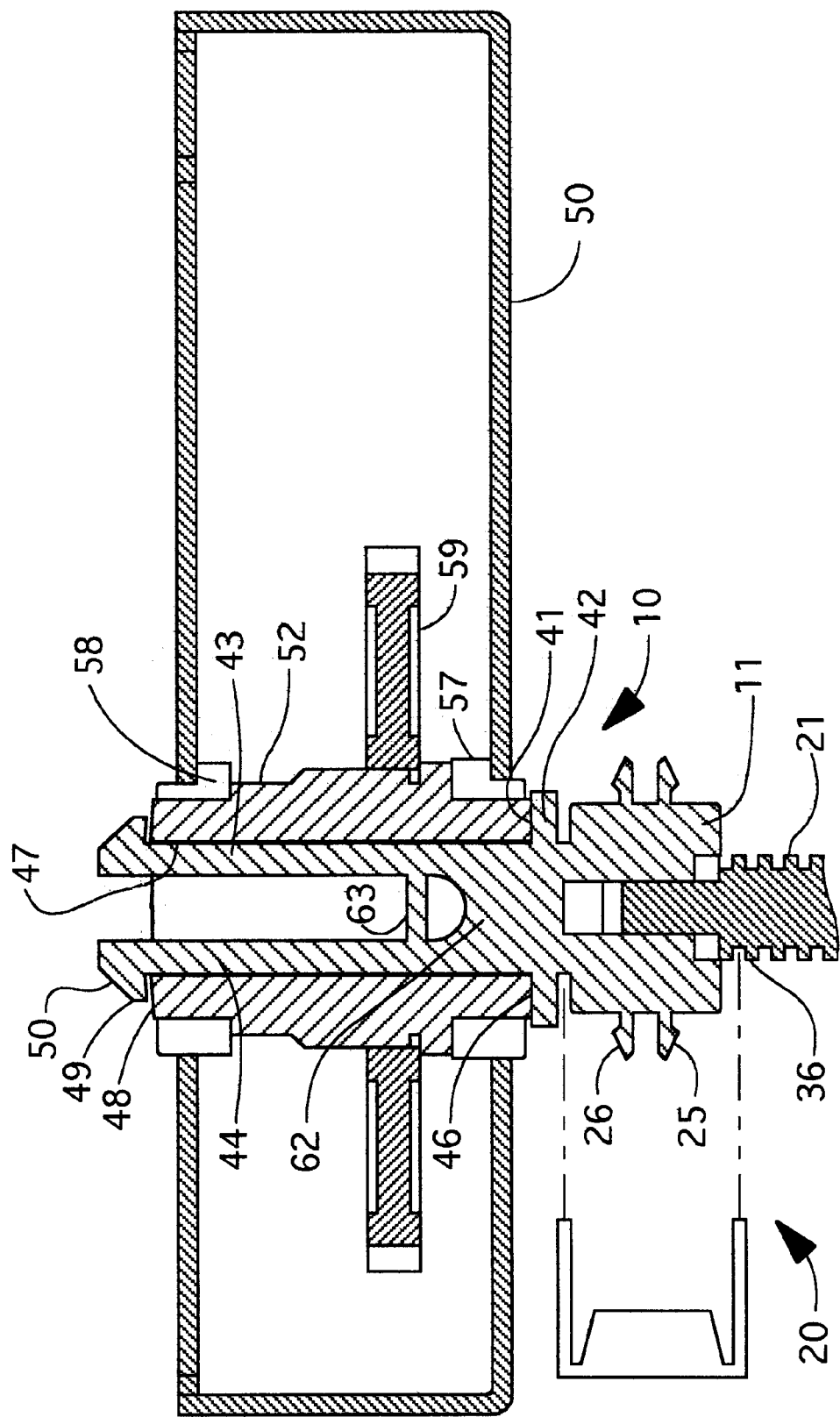
FIG. 2 is a section view of the adapter mated with the hub.
Figure 3:
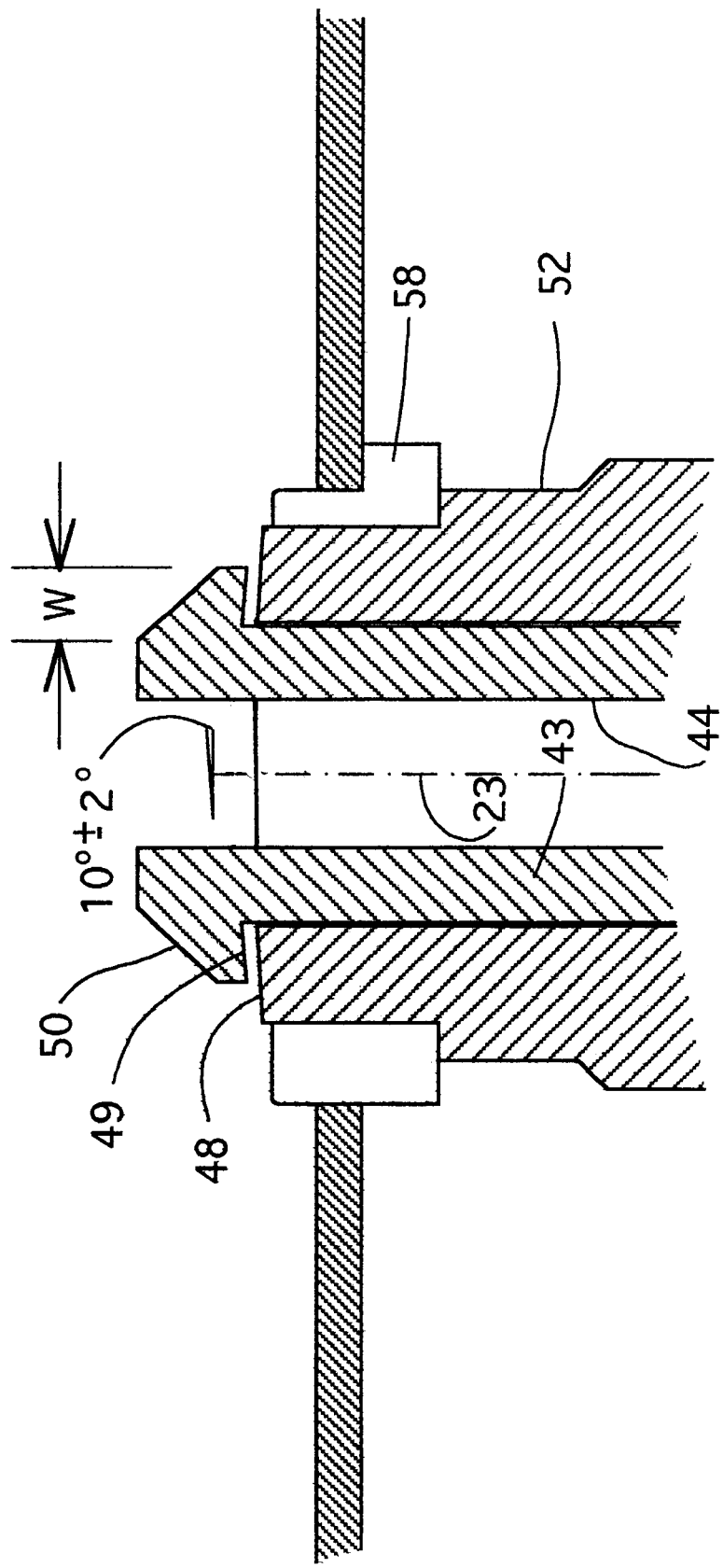
FIG. 3 is a enlarged section view of a portion of FIG. 2 showing a portion of the adapter and the hub adjacent to that adapter portion.

The adapter 10 of FIGS. 1–3 is intended to attach a jackscrew 21 to an actuator hub 52 having a bore 47 of predetermined length between respective first and second end surfaces 46 and 48, and a predetermined cross section shape and size. A preferred embodiment of FIGS. 1–3 will fit in a standard ½ in. (1.27 cm.) square bore 47 of a hub type output element. Of course adapter 10 can also be designed to fit a variety of bore 47 shapes and sizes and hub 52 lengths as well. Adapter 10 in essence functions as a special detachable actuator shaft for inserting in the bore of an actuator hub 52. Hub 52 carries a gear 59 which forms the final gear in the typical gear train by which the relatively high speed of the drive motor is reduced to the typical few RPM for the actuator output element. Hub 52 is shown in FIG. 2 mounted in a housing 50 and rotating on bearing elements 57 and 58.

The details of the mating structure by which the adapter 10 mates with jackscrew 21 are not a part of this invention, but do form the subject invention of a related copending application Ser. No. 09/052,397 having the same filing date as the parent of this application, and having as two of its inventors, Knutson and Zhu of this application. However, we do consider the combination of such a mating structure for connecting to a jackscrew 21 or other cylindrical member, and the structure for connecting adapter 10 to hub 52, as comprising an expanded form of this invention. To place the instant invention in context and to better explain this expanded form of the invention, it is helpful to briefly explain the mating structure comprising this related invention. Adapter 10 includes a body 11 having features 25 and 26 which engage a retainer element, not shown, which locks jackscrew 21 into a bore 13, and a projection 24 to assure proper positioning of the retainer. Bore 13 has a non-circular cross section mating with a part of jackscrew 21 having a matching cross section so as to force adapter 10 and jackscrew 21 to rotate together and transfer torque between them.

Turning now to the features of adapter 10 which form the subject invention, it is convenient to first define an axis 23 extending along the rotational axis of jackscrew 21 and hub 52. Conventionally, hub 52 has a predetermined length between a first end surface 46 shown in FIG. 1 and a second end surface 48 shown on edge in FIG. 2. A bore 47 extends between surfaces 46 and 48, and has an interior surface with a predetermined cross section, shown as square, but which in fact may be any convenient noncircular size and shape. The shape of bore 47's cross section forms a first mating feature. Bore 47 is also shown as having a constant cross section along its length, but this is not necessary. Other non-circular cross sections besides square may also be acceptable. First end surface 46 is shown as flat and perpendicular to axis 23. Second end surface 48 is shown as angled or beveled with respect to the perpendicular or normal of axis 23. This sloping of surface 48 with respect to the perpendicular of axis 23 is in the nature of a reversed funnel, albeit a relatively shallow or obtuse-angled funnel. Because English appears to lack a term for this particular surface 48 angular arrangement where the normal to surface 48 makes an acute inside angle with axis 23, we will coin the term "backslanted" bevel to define this general arrangement of surface 48. The value of this acute inside angle can be around 8–12° with 10° currently preferred. It is unnecessary for surface 48 to be flat, and can be convexly shaped or have a ridge or depression which can mate with a feature of adapter 10. In such a configuration, the average angle can fall within this 8–12° range. The backslanted bevel need only exist in the vicinity of bore 47 but manufacturing considerations may dictate a bevel across the entire surface 48. The discussion of adapter 10 shape will provide further definition of surface 48. Other aspects of the shape for hub 52 are determined more by engineering convenience for the system involved.

Adapter 10 has a body 11 and a stub shaft 62 attached to body 11 at a proximal end. Shaft 62 also has a distal end spaced away from body 11. Shaft 62 has a cross section shape forming a second predetermined mating feature and which is complementary to the interior cross section or shape of bore 47. By "complementary" we mean that when there is proper angular orientation between shaft 62 and bore 47, shaft 62 can enter bore 47 telescope-wise and the mating feature of each prevent relative rotation between hub 52 and adapter 10. It is not necessary for the cross section of shaft 62 to exactly match the cross section of bore 47, but when shaft 62 is mated with bore 47, torque should transmit between adapter 10 and hub 52 with little or no backlash. A stop element 42 is attached to body 11 and has a stop surface 41 (see FIG. 2) facing away from body 11. Stop surface 11 meets end surface 46 to create an axial limit on the position of adapter 10 relative to hub 52.

Arms 43 and 44 are attached at first ends of each to the distal end of shaft 62, and extend generally in cantilever fashion along axis 23 away from shaft 62. Arms 43 and 44 are preferably integral with stop feature 42 and body 11, and are formed of some type of flexible material, typically a hard, tough plastic. It should be possible to deflect arms 43 and 44 toward each other by an amount adequate to permit the operation to be described. A brace or web 63 may be placed between and integral with arms 43 and 44 near their attachment to shaft 62 to lend additional stiffness to arms 43 and 44 if necessary. Arm 44 has a retainer feature comprising a projection formed of ramp surface 50 and an engagement surface 49, surface 49 generally facing stop surface 41. The spacing between stop surface 41 and engagement surface 49 should be slightly greater than the spacing between end surfaces 46 and 48. Arm 43 carries similar ramp and engagement surfaces. The arrangement of arms 43 and 44 and their respective ramp surfaces and engagement surfaces allows engagement surface 49 to engage end surface 48 when the adapter 10 is completely inserted in bore 47 with stop surface 41 in contact with end surface 46.

The spacing between the ends of arms 43 and 44 and their thickness, the distance W (see FIG. 3) by which engagement surfaces project from the outer surfaces of arms 43 and 44, and the size of the bore 47 cross section must all cooperate to allow the arms 43 and 44 to deflect toward each other by an amount allowing the retainer features to pass through bore 47 and to spring into the position shown in FIG. 2 as end surface 46 near stop surface 41. In the position shown in FIG. 2, adapter 10 is firmly held in place and strongly resists axial force attempting to pull shaft 62 from bore 47. Thus shaft 62 and adapter 10 are immobilized with respect to hub 52. But should it be necessary to remove or withdraw adapter 10 from bore 47, the projecting ends of arms 43 and 44 can be pinched together allowing the retainer features to reenter and pass through bore 47. Removing adapter 10 from bore 47 may be necessary should jackscrew 21 or the actuator itself fail and need to be replaced.

As was previously mentioned, adapter 10 is intended to transfer torque in both directions from hub 52 to jackscrew 21 as well as axial force in both directions from hub 52 to jackscrew 21. In some cases, it is possible for vibration or high axial loads during operation to cause arms 43 and 44 to deflect inwardly an amount which allows adapter 10 to release and withdraw from bore 47. The previously discussed backslanted bevel of second end surface 48 cooperates with a matching or complementary backslanted bevel on engagement surface 49. By "matching or complementary" we mean that engagement surface 49 has approximately the same topology of and is approximately parallel to end surface 48. Parallelism of course cannot be in the classic or geometric sense if surfaces 48 and 49 are not flat. It is not necessary for surfaces 48 and 49 to be flat, but it is likely that this is preferable because it simplifies fabrication. Where surfaces 48 and 49 are flat each of these backslanted bevels on end surfaces 48 and 49 preferably have an angle with respect to the normal to axis 23 of approximately 10° with a range of from 8–12°. Even if surfaces 48 and 49 are not precisely flat, we believe that a general or average angle of the backslanted bevel in the 8–12° range is suitable with approximately 10° as preferred. A greater angle will more securely retain the arms 43 and 44 within bore 47, but will result in a slightly greater amount of axial or linear backlash caused by the need for clearance between the outer edge of each surface 49 and inner edge of surface 48 while attaching adapter 10 to allow arms 43 and 44 to assume their undeflected position as shown in FIG. 2. The width dimension W shown in FIG. 3 may be on the order of 0.10 in. (2.54 mm) for a bevel angle of 10° nominal. If the angle is smaller, then W may have to be larger to provide adequate resistance to axial withdrawal during heavy axial loads. Of course W should not be so large that arms 43 and 44 cannot deflect sufficiently to enter bore 47.

There are numerous variations on the basic features of the connector system described above. Some of these have been already mentioned in the course of describing the particular system above. But there are of course others which have not been mentioned. For example, in some cases a single arm 44 will be adequate for properly retaining adapter 10 within bore 47. Stop element 42 may have any convenient shape and its surface need not be normal to axis 23. It is not essential that the retainer features have a ramp 50, although ramp 50 certainly allows for more convenient insertion. There are many other variations possible as well. We intend all of these and other variations which fall within the spirit of our invention to be included in the definition provided by the claims which follow.

We claim:

1. An adapter for connecting an operated device having a predetermined connection structure, to a bore in an actuator hub, said bore having an interior surface, a predetermined length extending between first and second end surfaces of the hub, and an interior surface cross section of predetermined size and noncircular shape, said bore's cross section having a first predetermined mating feature, said bore adapted to apply torque and axial force to an output shaft having a cross section having a second predetermined, noncircular mating feature complementary to the first mating feature and matable therewith, said adapter having an axis having first and second opposite directions, said adapter including a) a body;

b) a connection feature unitary with the body and extending generally in the first axis direction, for connecting to the connection structure;

c) an output shaft unitary at a proximal end with the body and extending generally along the second axis direction and terminating in a distal end, and having the second, noncircular mating feature on the shaft's periphery;

d) a stop feature integral with the shaft's proximal end, and having a surface generally facing in the second axis direction;

e) a first arm having a first end attached to the shaft's distal end, said arm extending in the second direction along the axis and terminating in a second end, said arm resiliently deflecting as a beam; and f) a retainer feature attached to the arm's second end and projecting generally perpendicularly to the adapter axis and with an engagement surface generally facing the stop feature, said retainer feature engagable with a hub end surface when the adapter shaft is in a mated position with the hub's bore, and disengagable from the hub end surface by deflection of the arm away from the interior surface of the hub's bore.

2. The adapter of claim 1, wherein a spacing between the retainer feature and the stop feature is substantially equal to a spacing between the first and second hub end surfaces.

3. The adapter of claim 2 wherein the retainer feature includes a ramp surface facing outwardly from the adapter axis.

4. The adapter of claim 2 wherein the arm is integral with the shaft.

5. The adapter of claim 2 wherein the shaft's cross section is substantially square.

6. The adapter of claim 1 wherein said retainer feature's engagement surface has a backslanted face for mating with a hub's second surface, said second surface having a backslanted bevel.

7. The adapter of claim 6 wherein the retainer feature's backslanted face has an angle of from 8–12° with respect to the perpendicular of the axis.

8. The adapter of claim 7 wherein the retainer feature's backslanted face has an angle of approximately 10° with respect to the perpendicular of the axis.

9. The adapter of claim 6 in combination with an actuator hub with which the adapter mates, wherein said hub has an end surface having a backslanted bevel for mating with the backslanted face of the retainer feature's engagement surface.

10. The actuator hub of claim 9, wherein the second end surface has an angle of from 8–12° with respect to the perpendicular of the axis.

11. The actuator hub of claim 10, wherein the second end surface has an angle of approximately 10° with respect to the perpendicular of the axis.

12. The adapter of claim 1, wherein the arm extends in cantilever fashion from the shaft's distal end.

13. The adapter of claim 1, and further comprising a mating structure attached to the proximal end of the shaft and extending along the axis and away from the shaft, said mating structure for mating with a substantially rectangular member and when so mated, allowing transfer of torque between the adapter and the substantially rectangular member.

14. An adapter in combination with an actuator hub for connecting an operated device having a predetermined connection structure, to a bore in the actuator hub, said bore having an interior surface, a predetermined length extending between first and second end surfaces of the hub, and an interior surface cross section of predetermined size and noncircular shape, said bore's cross section having a first predetermined mating feature, said bore adapted to apply torque and axial force to an output shaft having a cross section having a second predetermined mating feature complementary to the first mating feature and matable therewith, said adapter having an axis having first and second opposite directions, said adapter including a) a body;

b) a connection feature unitary with the body and extending generally in the first axis direction, for connecting to the connection structure;

c) a shaft unitary at a proximal end with the body and extending generally along the second axis direction and terminating in a distal end, and having the second mating feature on the shaft's periphery;

d) a stop feature integral with the shaft's proximal end, and having a surface generally facing in the second axis direction;

e) a first arm having a first end attached to the shaft's distal end, said arm extending in the second direction along the axis and terminating in a second end, said arm resiliently deflecting as a beam; and f) a retainer feature attached to the arm's second end and projecting generally perpendicularly to the adapter axis and with an engagement surface generally facing the stop feature, said retainer feature engaging a hub end surface when the adapter shaft is in a mated position with the hub's bore, and disengagable from the hub end surface by deflection of the arm away from the interior surface of the hub's bore.

15. The combination of claim 14 wherein the actuator hub has a second end surface having a backslanted bevel, and wherein said retainer feature's engagement surface has a backslanted face substantially matching, and for mating with, the second end surface's backslanted bevel.

* * * * *